(12) United States Patent
Saeed

(10) Patent No.: US 9,028,217 B2
(45) Date of Patent: May 12, 2015

(54) ROTOR SYSTEM

(75) Inventor: Osman Saeed, London (GB)

(73) Assignee: Elemental Engineering AG, Stans (CH)

( * ) Notice: Subject to any disclaimer, the term of this patent is extended or adjusted under 35 U.S.C. 154(b) by 674 days.

(21) Appl. No.: 13/500,189

(22) PCT Filed: Oct. 4, 2010

(86) PCT No.: PCT/GB2010/001853
§ 371 (c)(1),
(2), (4) Date: Jun. 15, 2012

(87) PCT Pub. No.: WO2011/042687
PCT Pub. Date: Apr. 14, 2011

(65) Prior Publication Data
US 2012/0243994 A1    Sep. 27, 2012

(30) Foreign Application Priority Data

Oct. 5, 2009 (GB) .................................. 0917414.5

(51) Int. Cl.
*F03D 11/04* (2006.01)
*F03D 3/06* (2006.01)
(Continued)

(52) U.S. Cl.
CPC ................ *F03D 3/061* (2013.01); *F03D 3/005* (2013.01); *F03D 3/062* (2013.01); *F03D 11/04* (2013.01); *F04D 29/384* (2013.01); *Y02E 10/721* (2013.01); *Y02E 10/728* (2013.01); *Y02E 10/74* (2013.01)

(58) Field of Classification Search
CPC ....... F03D 3/065; F03D 3/064; F03D 1/0608; F03D 1/0658
USPC .......................................................... 416/205
See application file for complete search history.

(56) References Cited

U.S. PATENT DOCUMENTS 708,375 A * 9/1902 Lowe ............................... 417/35
4,624,624 A * 11/1986 Yum ............................... 416/87
(Continued)

FOREIGN PATENT DOCUMENTS

DE    19859865 A1    8/2000
EP    2028102 A1    2/2009
(Continued)

OTHER PUBLICATIONS

"PCT International Search Report dated Apr. 7, 2011 for PCT/GB2010/001853, from which the instant application is based," 3 pgs.
(Continued)

*Primary Examiner* — Nathaniel Wiehe
*Assistant Examiner* — Eldon Brockman
(74) *Attorney, Agent, or Firm* — Fredrikson & Byron, P.A.

(57) ABSTRACT

Embodiments of the invention relate to a rotor system, particularly for use in a wind turbine generator system. A support (11) is provided having first and second rotating members (12, 13) coupled thereto, the rotating members being able to rotate about a common axis. One or more flexible blades (14, 15) having at least two ends are provided, one end being mounted on the first rotating member and another end being mounted on the second rotating member, so that they may rotate about the common axis. Actuating means are provided, being arranged to cause the ends of each blade to move closer together by movement of at least one of the rotating members along the common axis. The first and second rotating members are arranged to rotate relative to each other, said rotation allowing the flexible blades to coil around an axis.

23 Claims, 14 Drawing Sheets

(51) Int. Cl.
 *F03D 3/00* (2006.01)
 *F04D 29/38* (2006.01)

(56) References Cited

U.S. PATENT DOCUMENTS

| | | | |
|---|---|---|---|
| 5,405,246 A | | 4/1995 | Goldberg |
| 7,241,105 B1 * | | 7/2007 | Vanderhye et al. ............ 415/4.2 |
| 2002/0071757 A1 | | 6/2002 | Navarro |
| 2006/0263198 A1 | | 11/2006 | Kinkaid |
| 2008/0273977 A1 * | | 11/2008 | Beard ........................ 416/176 |
| 2008/0296905 A1 | | 12/2008 | Ferguson |

FOREIGN PATENT DOCUMENTS

| | | |
|---|---|---|
| GB | 2165008 A | 4/1986 |
| JP | 2007085271 A | 4/2007 |
| SE | 415910 B1 | 11/1980 |

OTHER PUBLICATIONS

"PCT Written Opinion dated Apr. 7, 2011 for PCT/GB2010/001853, from which the instant application is based," 6 pgs.

Search Report for GB0917414.5 dated Jan. 29, 2010 (4 pgs.).

* cited by examiner

ROTOR SYSTEM

RELATED APPLICATIONS

This application is a 35 U.S.C. 371 national stage filing from International Application No. PCT/GB2010/001853 filed Oct. 4, 2010, which claims priority to British Application No. 0917414.5 filed Oct. 5, 2009, the teachings of which are incorporated herein by reference.

FIELD OF THE INVENTION

The present invention relates to rotor systems, particularly for wind generator devices, and particularly wind turbine generator devices.

BACKGROUND OF THE INVENTION

Propeller type turbines that have a number of blades extending radially from a central hub are well known. Incident wind causes the propeller blades to rotate about the hub, causing a shaft to rotate within a generator to generate electricity.

The problem with known turbine arrangements is that they rely upon large structures and heavy non flexible blade designs, which reduces efficiency and makes them very difficult to erect and maintain. It is also necessary to angle the blades into the direction of oncoming wind, which requires the nacelle of the turbine to be pivotable about the main support. Again, this makes for a more complicated design with more moving parts.

Also known in the art are vertical axis wind turbines such as the Darrieus design. Darrieus turbines have a number of aerofoils, typically two, mounted vertically about a rotating shaft. In constant wind speeds the Darrieus type turbine can, in theory, operate as efficiently as the propeller type turbines, but in practice physical stresses, design limitations and wind speed variation result in them being less efficient. Darrieus turbines can also be difficult to erect and often require complex support tethers or frames, as well as being vulnerable to high wind conditions.

We have appreciated that there is a need to provide a turbine generator that can be easily erected, and that has lightweight blade structure, whilst still retaining a strong structure and being able to control the speed at which the turbine rotates in all wind conditions.

SUMMARY OF THE INVENTION

The invention is defined in the claims to which reference is now directed.

Embodiments of the invention provide a rotor system, particularly one to be used in a wind turbine generator system, comprising a support. First and second rotating members are coupled to the support, the rotating members being able to rotate about a common axis. One or more flexible blades having at least two ends are provided, one end being mounted on the first rotating member and another end being mounted on the second rotating member so that they may rotate about the common axis. An actuator, or actuating means, is arranged to cause the ends of each blade to move closer together by movement of at least one of the rotating members along the common axis. The first and second rotating members are arranged so that they can rotate relative to each other, with the relative rotation allowing the flexible blades to each coil around an axis.

The actuating means may be arranged to cause the ends of the blades to move closer together by causing the first and second rotating members to rotate relative to each other. The relative rotation causes the flexible blades to coil around the common axis and subsequently the ends of each blade to move closer together by movement of at least one of the rotating members along the common axis. It may, therefore, be the coiling of the blades in response to the relative rotation that exerts a force to move the ends of the blades closer together.

The flexible blades preferably comprise a first flexible backbone, or outer backbone, mounted at one end on the first rotating member and at the other end on the second rotating member, and a flexible blade material attached to the first backbone along one side. The flexible blades may further comprise a second flexible backbone, or inner backbone, coupled to the first rotating member at one end and coupled to the second rotating member at the other end, the flexible blade material also being attached to the second flexible backbone along a different side to the first flexible backbone.

The main support for embodiments of the invention may be in the form of a mast, which may be able to collapse telescopically. The actuating means may be arranged to allow the first or second rotating member to rotate relative to the mast.

The mast may be free to rotate, but in certain embodiments may be fixed. Alternatively, the support may be provided by the second flexible backbone or by the first and second flexible backbones without requiring a mast.

A restraining ring may be attached to each of the flexible blades, being arranged to control the blade shape and particularly to restrict expansion of the blades perpendicular to their axis of rotation. The ring is preferably located at substantially the midpoint between the two rotatable members and may be attached to the flexible blades by a rotatable coupling to allow the flexible blades to change orientation with respect to the restraining ring without changing the orientation of the restraining ring.

DETAILED DESCRIPTION

Figure 1:
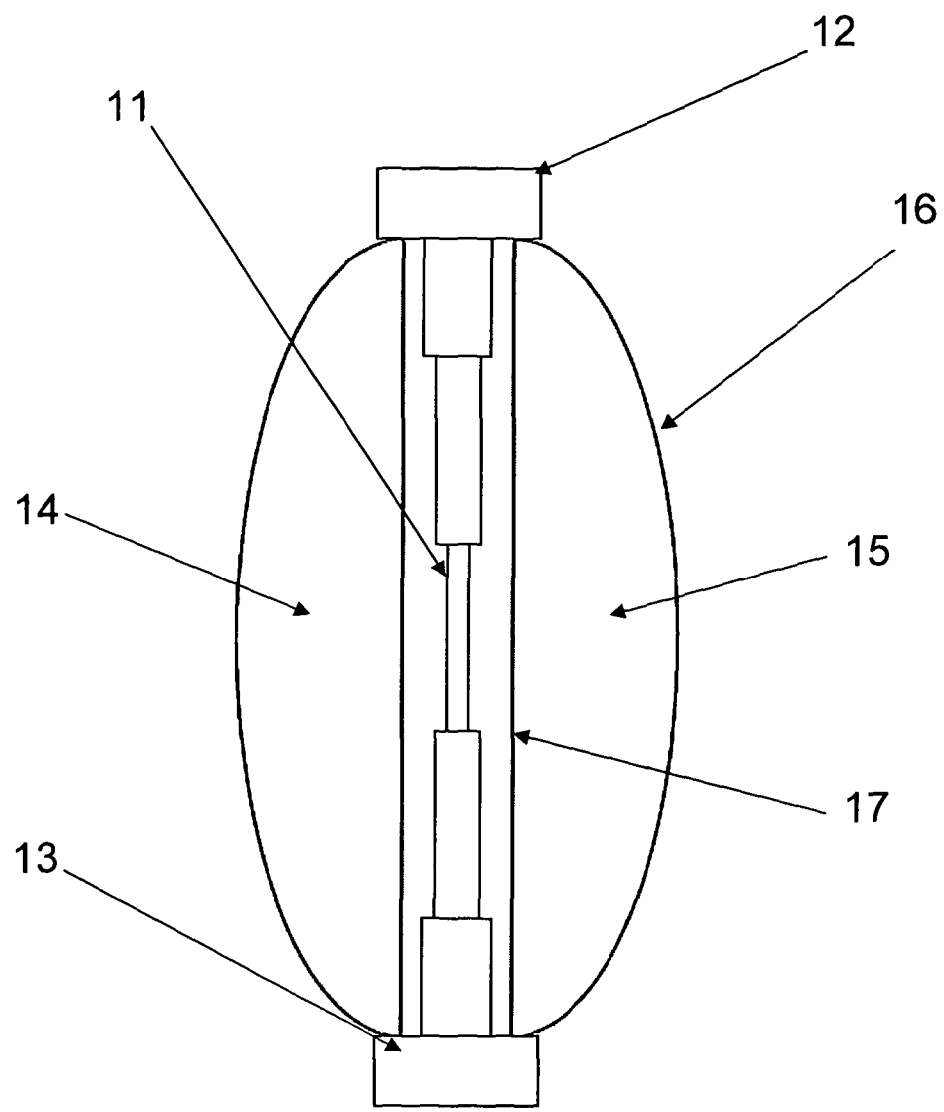
FIG. 1: is an embodiment of a wind turbine according to the present invention.

An embodiment of the invention will now be described in relation to FIG. 1. This embodiment provides a vertically mounted wind turbine generator, although the generator elements such as the alternator are not shown. As can be seen from FIG. 1, a mast or support 11 extends substantially vertically and a first rotating member or hub 12 is mounted rotatably on, and preferably at the top of, the mast. A second rotating member or mounting 13 is also provided which is secured to the mast. The first rotating member 12 is positioned at one end, in this instance the top, of the mast and the second rotating member 13 is positioned at the other end, in this case the bottom, of the mast. Preferably, the mast is collapsible, which can be achieved, as illustrated, by the mast being collapsible in a telescopic manner, such that in response to an urging force, the mast height decreases and the two rotating members move into closer proximity. The mast 11 is mounted so that it can rotate about its long axis (in FIG. 1 the vertical axis); the second rotating member 13 is fixed to the mast and rotates with it; and the first rotating member 12 is connected to the mast such that it can selectively rotate with the mast, or rotate relative to the mast.

Connected to the first rotating member 12 and the second rotating member 13 are one or more "blades" 14 and 15, these being the bodies upon which wind is incident to drive the turbine. The blades are comprised of a flexible outer backbone or reinforcement spine 16 that preferably extends in an arc or elliptical manner between the rotating members and is mounted at either end on the first and second members. The blade is then formed by connecting a flexible material to the outer backbone, effectively forming a "sail". An inner backbone 17 may also be provided to ensure the blade maintains its shape. The inner and outer flexible backbones provide support for the flexible material sail, and may be comprised of any durable material which is preferably more rigid than the flexible sail, yet also sufficiently flexible to allow it to bend in response to strong winds or when urged to coil. Suitable materials for the backbones include nylon or appropriately formed carbon fibre. The inner backbone extends radially from the axis of rotation of the blades to a lesser extent than the outer backbone. The flexible material sail provides the main surface for converting incident wind energy into rotational motion, and may be comprised of a fabric or carbon fibre fabric for example, or any other suitable flexible, lightweight and durable material.

Because the outer backbones are connected to the rotating members, being mounted thereon, the blades are able to rotate with the mast. Preferably, as shown, there is a corresponding turbine blade, of the same type, opposite the first blade so that any even number of turbine blades can be provided around the mast, for example 8 blades may be used. However, odd numbers of blades could also be used. It is strongly preferred, for all embodiments of the invention, that the blades are mounted about the mast equidistant from each other, for example as shown in the top down view of FIG. 6B.

Figure 2:
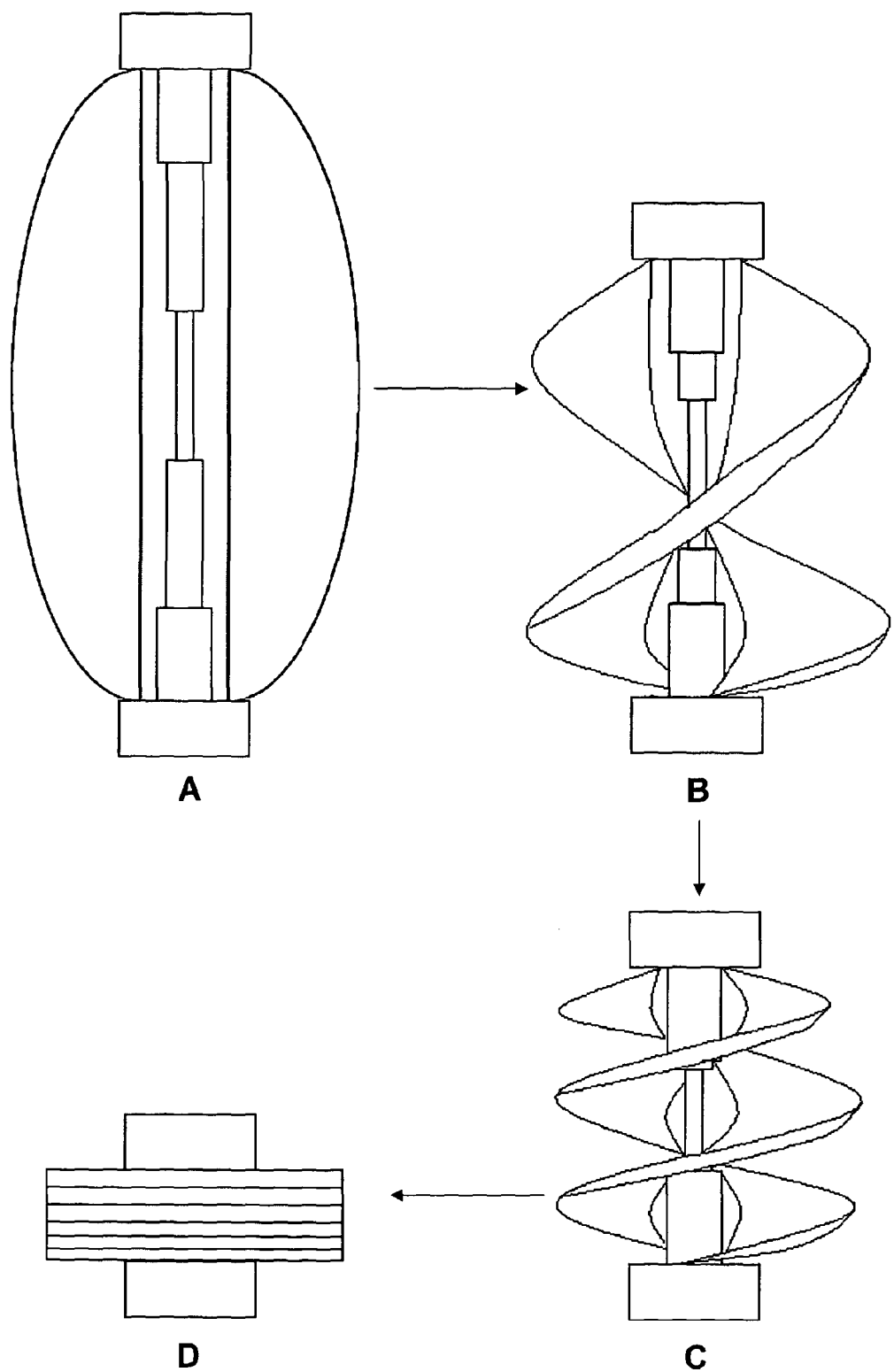
FIG. 2: is a flow diagram showing how the blades coil around the mast as the rotating members are urged closer together.

The basic means of operation of an embodiment of the invention is illustrated in FIG. 2, which shows how two blades are arranged during operation. Provided within the first rotating member are actuating means arranged to cause a relative rotation of the member about the mast. The arrangement is initially in an uncoiled state A with the blades rotating with the first rotating member and the mast as wind energy is incident upon them. As the actuating means causes the first rotating member to rotate relative to the mast, and to the second rotating member, the blades begin to twist around the mast. The actuating means can also be thought of as causing the first rotating member to rotate at a greater (or lesser) rate than the mast, and therefore also the second rotating member. The formation of a twist shortens the length of the blade in the direction along the axis of rotation of the blades, resulting in an urging force being applied to the mast causing its main dimension (the longest dimension - here the vertical dimension) to reduce. As the first rotating member 12 moves closer to the second rotating member 13, the blades form into a helix. The closer the two rotating members move together, the greater the number of degrees, or the number of times, the blades each twist around the mast. The number of helical revolutions, or twists, of the blade about the mast is dependant upon the distance between the ends of the blades, and therefore the distance between the rotating members. The number of twists is used to control the speed at which the turbine rotates, since shortening the distance between the rotating members results in the altering of the pitch of the blades relative to the wind. The speed of rotation is dependent upon the torque curve for the particular wind profile in which the apparatus is operating in, but it should be noted that speed is not simply related to pitch of the blades, since the wind can take a non-linear path through the blades. Therefore, it is not simply the case that the closer together the rotating members are the slower the rate of revolution. In particular, the wind can also follow a helical path through the apparatus, resulting in a greater amount of energy being extracted from a particular volume of incident wind in comparison to turbines that operate in a single plane.

In FIG. 2, A represents the apparatus at full height. The blades are flat, extending radially in a single plane with respect to the mast. As the first rotating member is made to rotate at a different rate to the mast, the outer and inner backbones begin to extend, or coil, about the mast. A point is reached such as that in representation B where the blades can be seen to have almost coiled completely around the mast a single time. This continues until a point as in representation C where the blades are now coiled around the mast multiple times. The rotating members are brought closer and closer together by the urging force provided by the blades, forming a tighter and tighter helix, until the point illustrated in representation D is reached where the blades form a cylindrical packed shape, preventing the rotating members moving any closer together. At point D the blades will stop rotating since the cross-sectional area presented to oncoming wind is very small. This can also be used as a braking arrangement to restrict rotation during high winds by quickly urging the ends of the blades close together.

It should be appreciated that as the rotating members are being urged closer together, the blades will usually be rotating about the mast at the same time due to oncoming wind. The blades are able to coil around the mast in the manner shown in FIG. 2, whilst also rotating about the mast, due to the independent rotation of the first rotating member relative to the mast. As the backbone twists to accommodate the change in dimension parallel to the mast, the first rotating member is brought closer to the second member. Since the first rotating member can rotate relative to the mast, either end of each blade rotates a different number of degrees around the mast with respect to each other in the same time period, causing the backbone to twist around the mast. The whole process also works in reverse such that the blades can be uncoiled by reversing the relative rotation of the two rotating members.

Figure 3A:
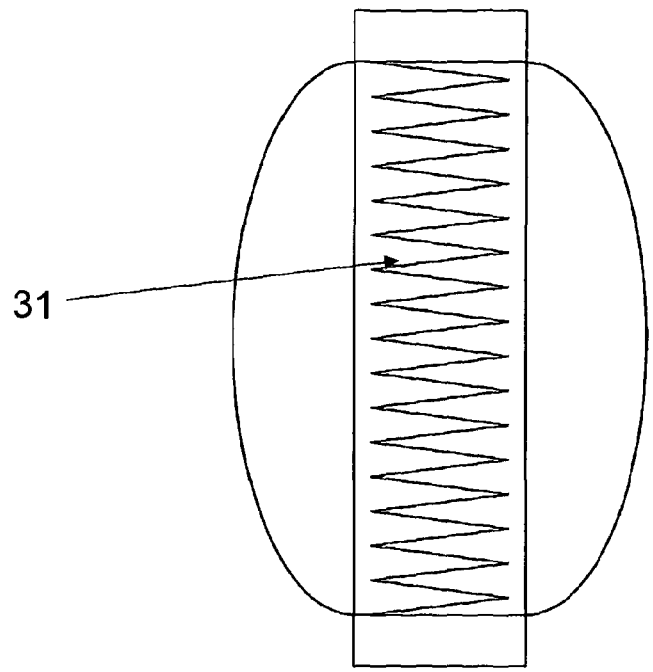
FIG. 3A: is an alternate construction for the support.
Figure 3B:
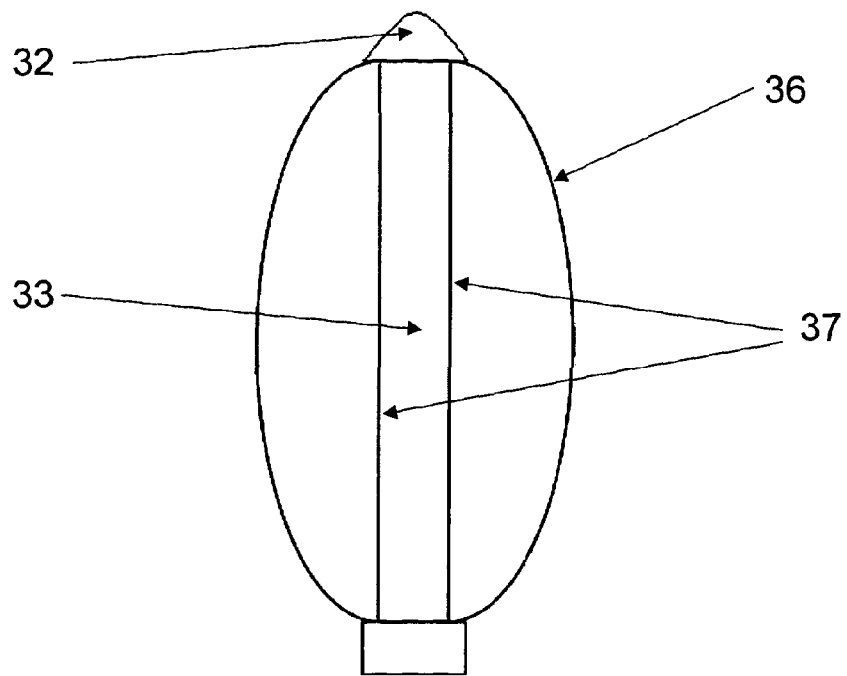
FIG. 3B: is an alternate construction for the support.

Although the embodiment above features a telescopic support or mast 11, alternative types of support structures are shown in FIGS. 3A and 3B. In FIG. 3A the mast is a resilient member, such as a spring, and can be seen as having a spiral structure which compresses as the rotating members move closer together, and extends again as the members are moved further apart. It is also possible to have a non collapsible support, provided the two ends of the blades can move closer together as they coil around the support. This could be achieved by allowing at least one of the rotating members to slide along the length of the mast, but providing a locking mechanism to fix them at desired points along the mast.

Figure 3C:
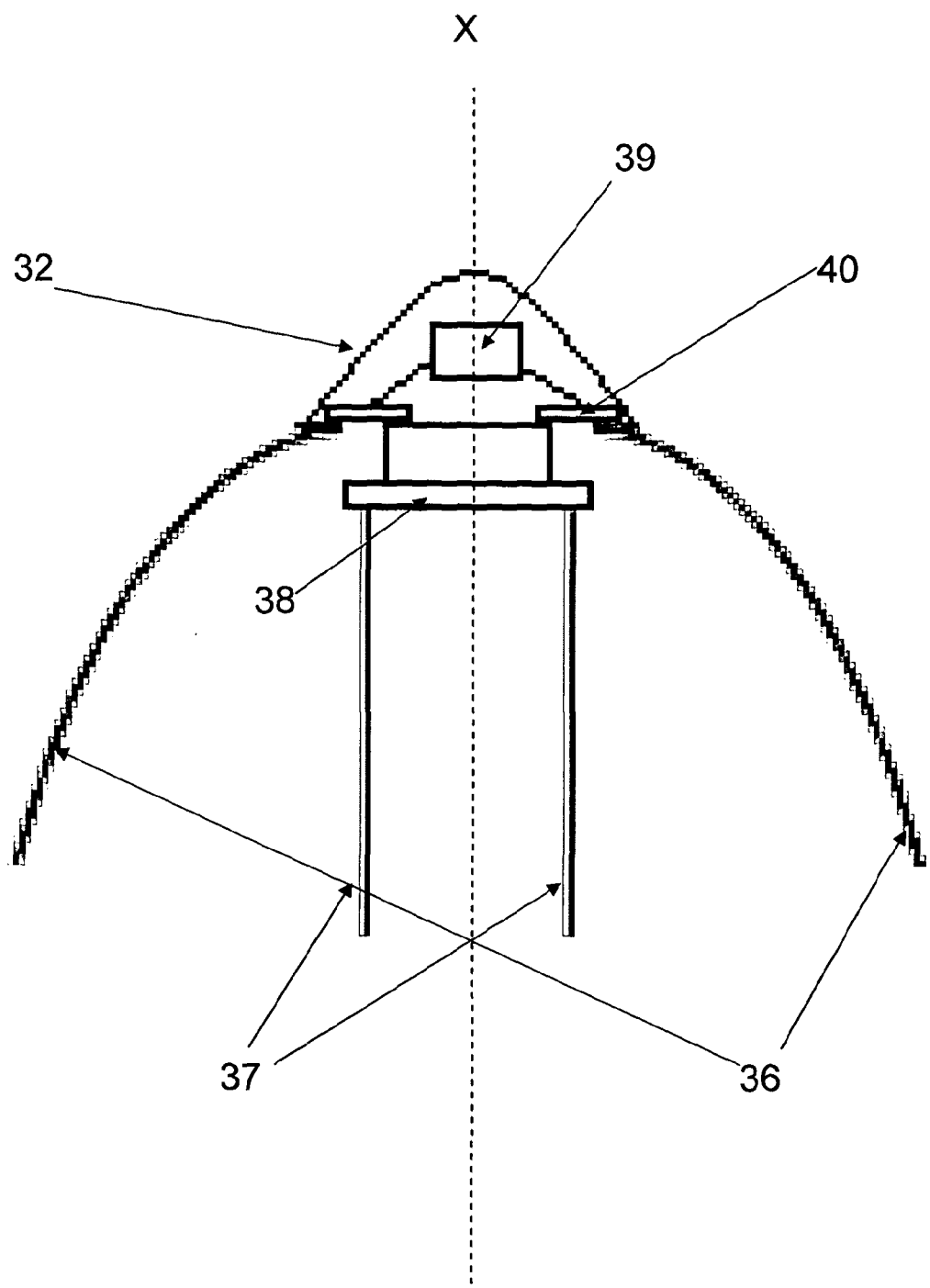
FIG. 3C: is an arrangement in which the inner backbones provide the main support.

Rather than using a mast it is also possible to rely on the flexible backbones as a support for the rotating members as illustrated in FIG. 3B. This is achieved by mounting the first rotating member 32 on the outer flexible backbones 36 of the blades, and coupling the inner backbones 37 to the first rotating member such that they can either be locked with respect to the member, or the member is able to rotate at a different rate with respect to the inner backbones. The inner backbones provide the primary support for the first rotating member, but the outer backbones provide secondary support. FIG. 3C shows the hub portion of FIG. 3B with an arrangement to allow relative rotation between the first rotating member and the inner backbones. The outer backbones 36 are mounted on the rotating member 32. The inner backbones are connected to the rotating member via a coupling member 38, on which the rotating member 32 is rotatably mounted. Actuating means 39 and 40 are arranged to either lock the coupling member 38 with the first rotating member, such that the rotating member and inner backbones rotate together, or to provide a rotational force between the coupling member 38 and the rotating member 32 such that they rotate with respect to each other. When the coupling member 38 and rotating member 32 are caused to rotate with respect to each other, the outer backbone begins to form a twist as discussed above. Since the inner backbone is coupled to the outer backbone by the flexible material (reference 14 in FIG. 1) the entire blade will coil about the axis of rotation of the rotating members/blades (X) in a similar way to that shown in FIG. 2, with the first rotating member moving closer to the second rotating member as the blade coils round.

Figure 3D:
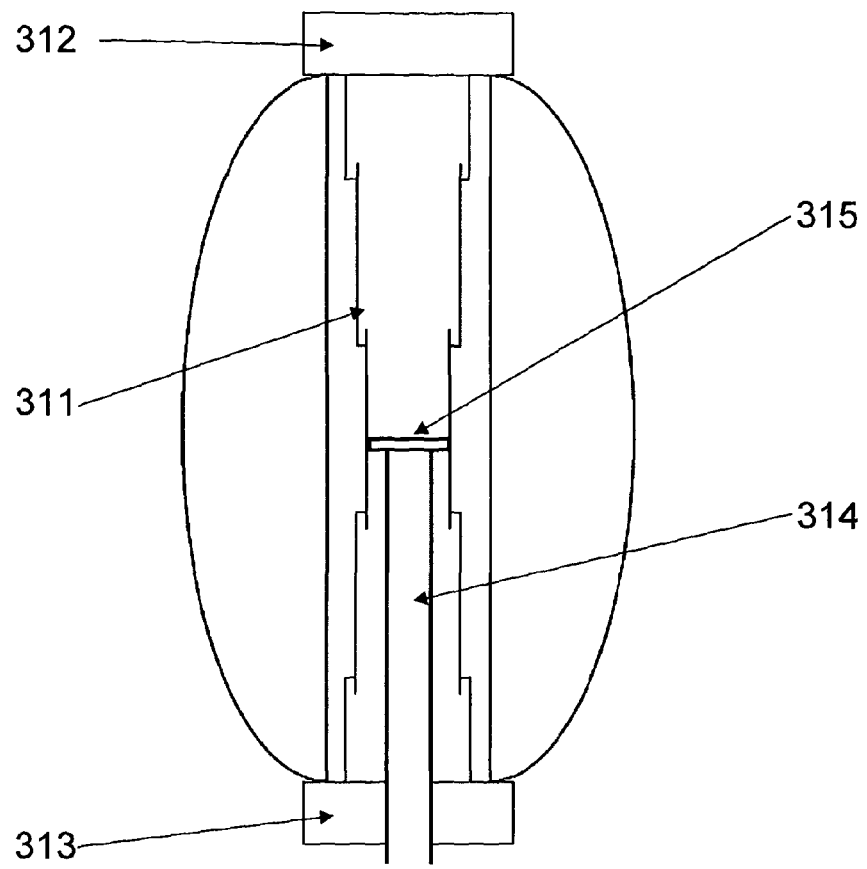
FIG. 3D: is an alternative construction for the support.
Figure 3E:
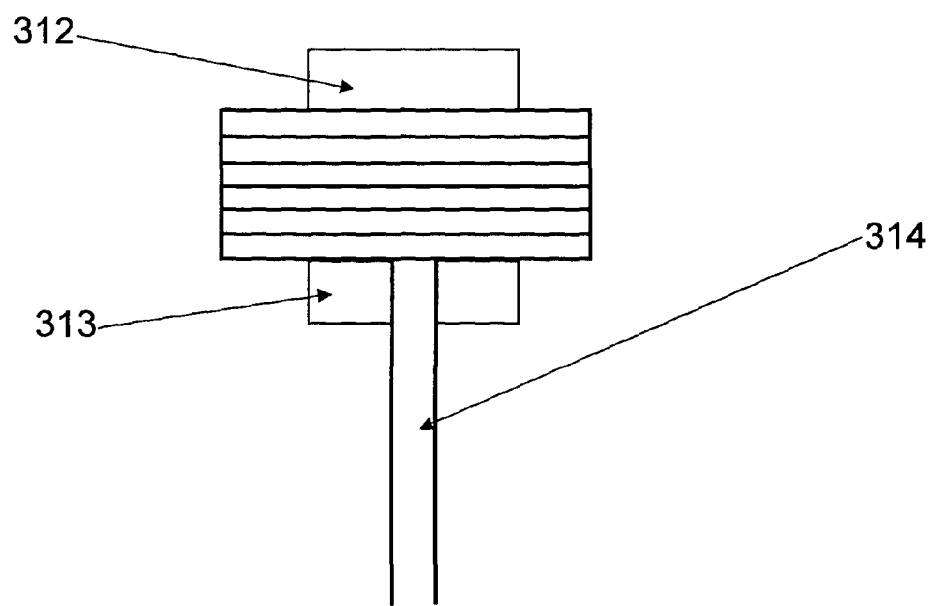
FIG. 3E: shows a turbine according to FIG. 3D when fully collapsed.

A further embodiment showing a further support arrangement is found in FIG. 3D. As with the embodiment of FIG. 1, the device features a first rotating member 312, which is preferably mounted at the top of the device, a second rotating member 313 and a telescopic support or mast 311. However, in the embodiment of FIG. 3D, the telescopic mast forms an outer support, with an inner support 314 provided within the outer support. The inner support is coupled to the outer support at a desired height, here the midpoint of the structure, by a coupling 315. The second rotating member 313 is slideably mounted on the inner support 314 so that it may slide along its length. This arrangement allows the apparatus to collapse about the point at which the inner support is coupled to the outer support. In this case, rather than the height of the first rotating member decreasing in relation to the fixed second rotating member, as indicated in FIG. 2, the two rotating members both move towards a common point, resulting in a collapsed structure as indicated in FIG. 3E. This allows the height at which the arrangement collapses to be selected such that the optimum height for a given wind profile can be obtained. Preferably the height of the inner support is adjustable such that the central collapse point can be controlled. The inner mast may be fixed, in which case the coupling between the inner and outer supports would be a bearing of some kind, or it could be rotatably mounted, in which case the coupling between the inner and outer supports would be fixed or they could be directly attached to each other. The different types of support discussed above could also be used in conjunction with an outer mast.

Figure 4A:
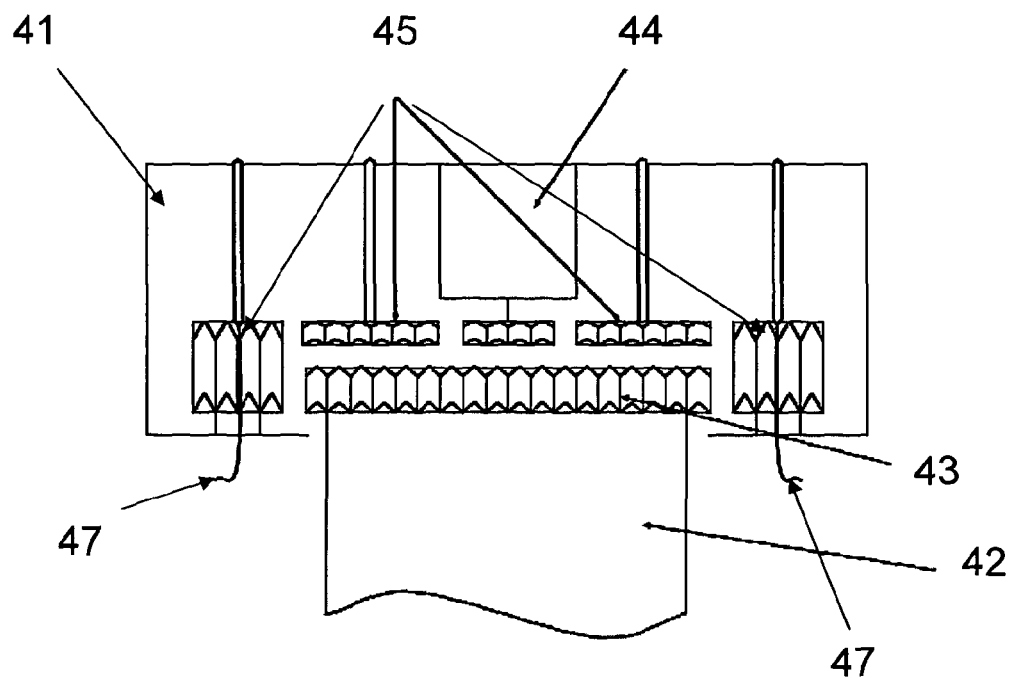
FIG. 4A: shows actuating means for rotating a rotating member relative to the support.
Figure 4B:
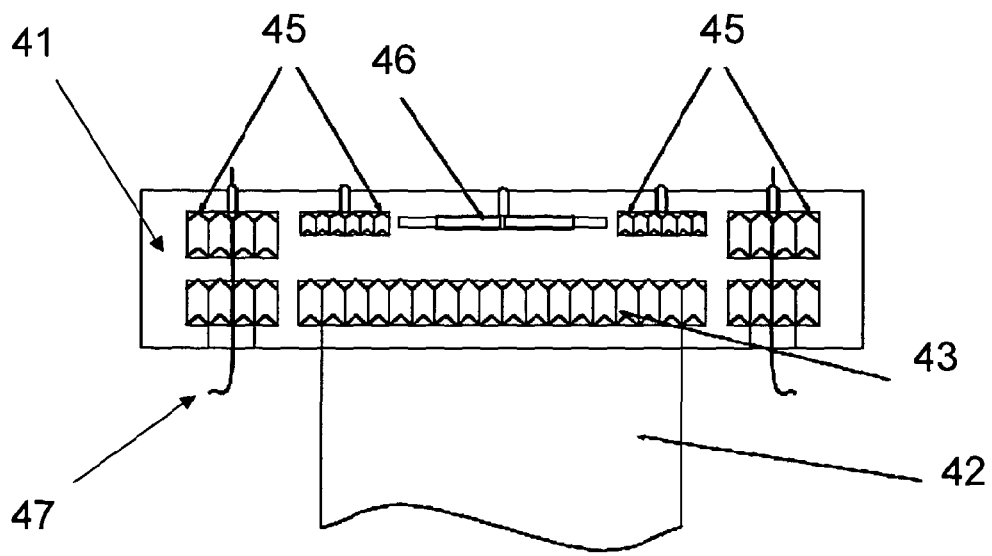
FIG. 4B: shows alternate actuating means for rotating a rotating member relative to the support.
Figure 4C:
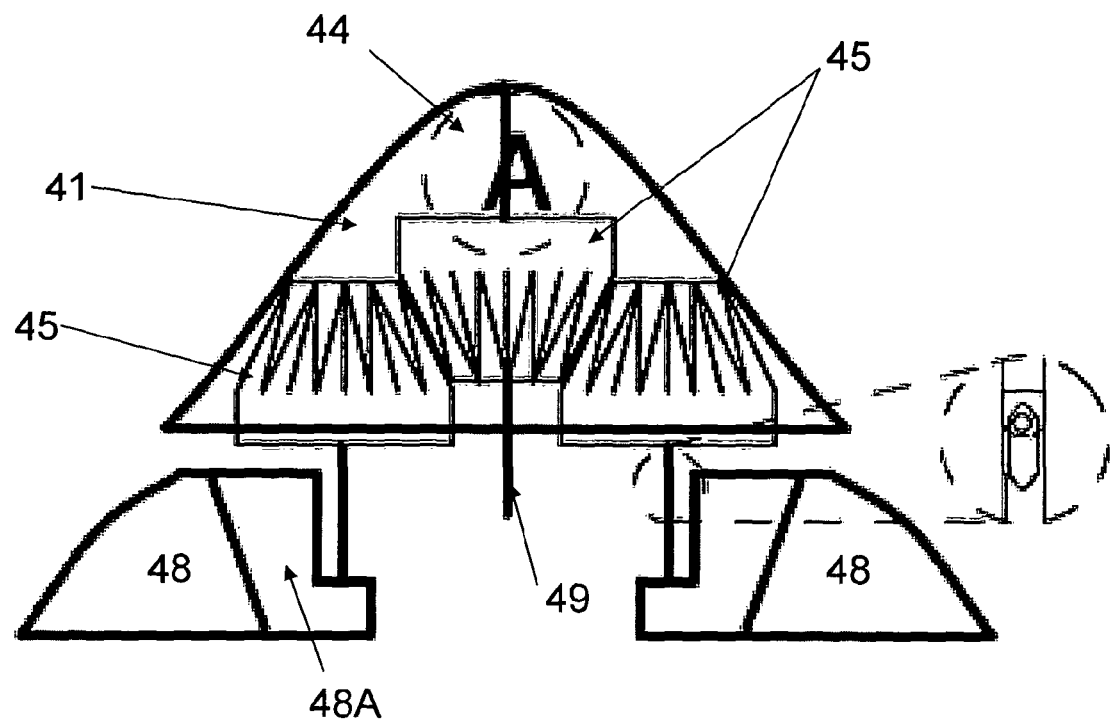
FIG. 4C: shows a further alternate actuating means for rotating the blades about the support.

As mentioned above, the first rotating member is provided with actuating means that allows it to be either locked with respect to the rotating mast such that it rotates at the same rate as the mast, or able to rotate with respect to the mast. Whilst the first rotating member has been labelled as the top rotating member, it could equally be the bottom rotating member that contains the actuating means. When it is desired to alter the pitch of the blades the actuating means are activated to cause the first rotating member to rotate relative to the mast, rather than rotating at the same rate. The result is that the first rotating member rotates at a different rate to the mast, and therefore one end of the blade rotates at a different rate to the other, causing the coiling of the blades as described in relation to FIG. 2. One way of achieving this is shown in FIG. 4A, which uses a mast as the main support. FIG. 4A shows a first rotating member 41 (although it is possible to use the second rotating member instead), having a mast 42. The outer backbones 47 are attached to the first rotating member. The mast is attached to the first rotating member via actuating means that can either be locked to allow the first rotating member to rotate with the mast, or can be used to allow the first rotating member to rotate at a different rate to the mast. The actuating means may comprise a series of cogs, beginning with mast cog 43, preferably a fixed base cog, which can be coupled via one or more further linking cogs 45 to a rotary actuator 44. The rotary actuator is used to turn the series of cogs, resulting in the first rotating member 41 rotating with respect to the mast cog 43 and thus with respect to the mast 42. It will be appreciated that if the rotary actuator is used when the mast is rotating, the first rotating member will be caused to rotate at a different rate to the mast. It is also possible to lock the cogs with respect to each other, or to lock the rotary actuator, such that there is no relative rotation between the mast and the first rotating member. FIG. 4B shows an alternative arrangement in which the actuating means comprises a series of cogs as before (having like numbers with the previous Figure), but using a linear actuator 46 to cause rotation of the cogs. Other types of actuator could be used in the actuating means, such as a worm gear. FIG. 4C shows a further alternative in which a rotating member 41 and a plurality of cogs 45 are connected to actuator 44. Here three cogs are used, with a first cog connected to the actuator and two further cogs coupled to the first cog. The backbones may pass through cogs 45 to act as a guide, or to align them with each other; in this case, the cogs would be free to rotate about the backbone. Not shown is a further cog, mounted on the main shaft 49, that the member 41 rotates about when required to coil the blades 48. The Figure shows an "A" where the actuator, preferably a rotary actuator, is placed, being mounted on the rotating member. Alternatively the actuator may be mounted on the main shaft or mast 49 that extends down from the rotating member. A further alternative actuating means, rather than using a series of cogs with an actuator of some kind, would be to use a set of magnets around the portion of the mast within the first rotating member, and a set of electrically conducting coils mounted within the first rotating member (or vice-versa), to generate rotation by electromagnetic force, as used in electric motors/generators. A physical locking means could be provided, which engages with the mast to prevent relative rotation.

Although the above examples of actuating means are described and shown with a mast it is possible to remove the mast and use the backbones as the main supports, as mentioned earlier. In this instance the same principles apply as above, but the inner backbones are attached to the mast cog 42, preferably in the manner shown in FIG. 3C, with the outer backbones being attached to the first rotating member as before. Relative rotation between the first rotating member and the inner backbones still results in one end of the blade rotating about the main axis relative to the other end, and causes the outer backbones to twist about the axis of rotation as described above. The inner backbones will also develop a twist since they are connected to the outer backbones by the flexible material (sail material), resulting in a similar twisting arrangement as shown in FIG. 2, but without the need for a collapsible mast.

The actuating means described above rely on rotating one end of each blade about the axis of rotation of the blades at a higher or lower rate than the other end of the blade to develop the required twisting action. As an alternative, or in addition to the above, it is possible to have actuating means that directly twist the blade at one end relative to the other end. In such embodiments it may not be necessary for the rotating members to rotate relative to each other, although this is still possible. Such a twisting action causes the other end of the blade to rotate at a higher or lower rate than the other, resulting in the blades twisting about their axis of rotation. This can be described in relation to FIG. 4C. The backbones pass through cogs 45, as described above, but they are not free to rotate, rather a further gearing between the backbone and cog having a particular ratio, is used, said gearing preferably being powered by the actuator. Direct twisting of the backbones could also be achieved with the embodiments of FIGS. 4A and 4B by attaching one end of the backbones to the outermost cogs by an additional cog having a different ratio. FIG. 4C also shows an optional reinforcement portion 48A coupled between the blade and the joint, being arranged to strengthen the blade at the coupling point. The reinforcement portion would usually be made of a material of higher strength and/or rigidity than the blade material.

Embodiments described thus far have mostly included a single rotating member that can rotate with the support, or can be made to rotate with respect to the mast. One end of the blade is attached to the first rotating member, and another end is attached to a second rotating member which is fixed to rotate with the support. It would also be possible to connect the blade end directly to the rotating mast which would then function as the second rotating member. The second rotating member could also operate in a similar manner to the first rotating member already described. In this case, to generate a twist in the sail the two rotating members can be rotated in opposite directions relative to one another. The advantage of this is the reduction of the turning force needed to be generated by each actuator, since the twisting effort is shared. Of course, it is also possible for the second rotating member to contain the actuating means and the first rotating member to be fixed to rotate with the support.

It is also possible, where the support is a mast, for the support to not rotate at all. Instead, each rotating member is able to freely rotate about the mast, and the actuators are used to control the rate of rotation of each rotating member. What is important is that the two ends of each blade can rotate about the axis of rotation of the blades at a different rate in a controllable manner such that the coiling of the blades about said axis can be controlled. If the shaft does not rotate then power is generated by attaching a rotating member to an alternator.

The actuating means to cause the ends of the blades to move closer together, by movement of at least one of the rotating members along the common axis, may be in the form of an actuator that causes the support to change in length, such as an actuator for retracting/contracting a telescopic support or extendable boom. An example of such a system would use a collapsible telescopic support comprising a series of different diameter tubes nested one inside the other. A motor is provided for moving the tubes relative to each other to cause the support length to change. In such embodiments, at least one of the rotating members is free to rotate about the support. When it is desired to lower the blades the support is collapsed by the actuator. As the support is lowered, the rotating members move closer together. The blades, which are arranged to twist about the support when they are lowered, exert a force on the rotating members causing the free rotating member to rotate relative to the other allowing the blades to follow the twisting motion and coil around the support. The force required to move the ends of the blades may be provided by a combination of the actuating means acting on the support and additional actuating means causing relative rotation of the two rotating members as described above. Such arrangements would still operate in the same manner shown in FIG. 2.

The blades do not necessarily need to coil around the axis of a central support. Instead the blades may each coil around a different axis, particularly their own axis separate from the central support axis. Such an axis would be located radially between the central axis and the outermost point of the blade, and would preferably extend substantially parallel to the central axis. The coiled blade would resemble a helix structure beginning and ending at the central support axis, but with a central axis located away from the central support axis. This alternative coiling method would find particular use in those embodiments that include actuating means for retracting/contracting the support.

Figure 4D:
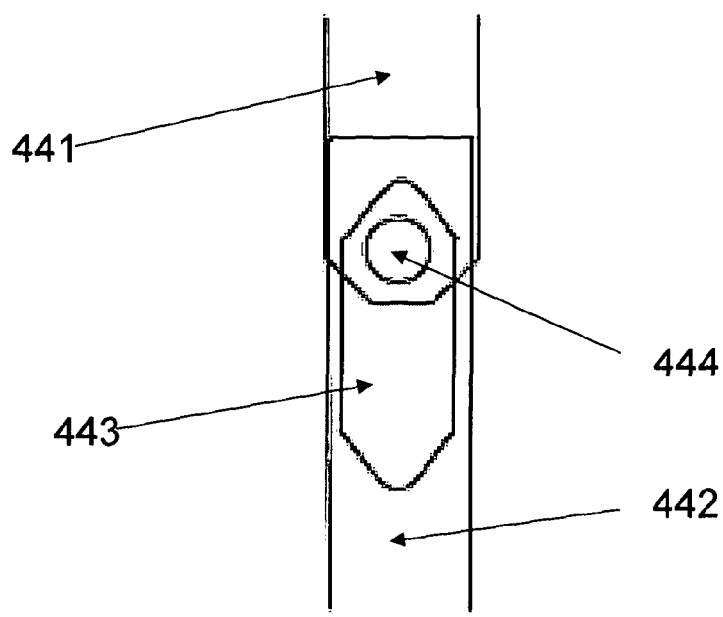
FIG. 4D: shows a coupling between a flexible backbone and a rotating member.

FIG. 4D shows an arrangement for connecting the flexible backbone to the hub. A joining member 441 is provided with a link 444 that passes from one side of the joining member to the other. At least a portion of the joining member is hollow, to accommodate a portion of the flexible backbone, with the link passing through the hollow portion. Flexible backbone 442 has an open portion or slot 443 that passes through the entire width of the backbone. A portion of the flexible backbone passes into the hollow portion of the joining member, with the link of the joining member protruding through the slot of the backbone. The result is that the two elements are linked together. The width, and length, of the slot is greater than the width, and length, of the link to allow a certain amount of play in the joint. Furthermore, the ends of the slot may be curved, as shown in the Figure, to allow a certain amount of pivoting about the link.

The coupling between the blades and the rotating members may be in the form of other types of joints. A ball and socket joint could be used. Alternatively, a universal joint could be used, preferably also being able to twist about its longitudinal axis to provide freedom of movement as the blades coil or uncoil as the case may be. A multi roller bearing universal joint or any other type of free joint allowing movement in all planes could by used.

Figure 5:
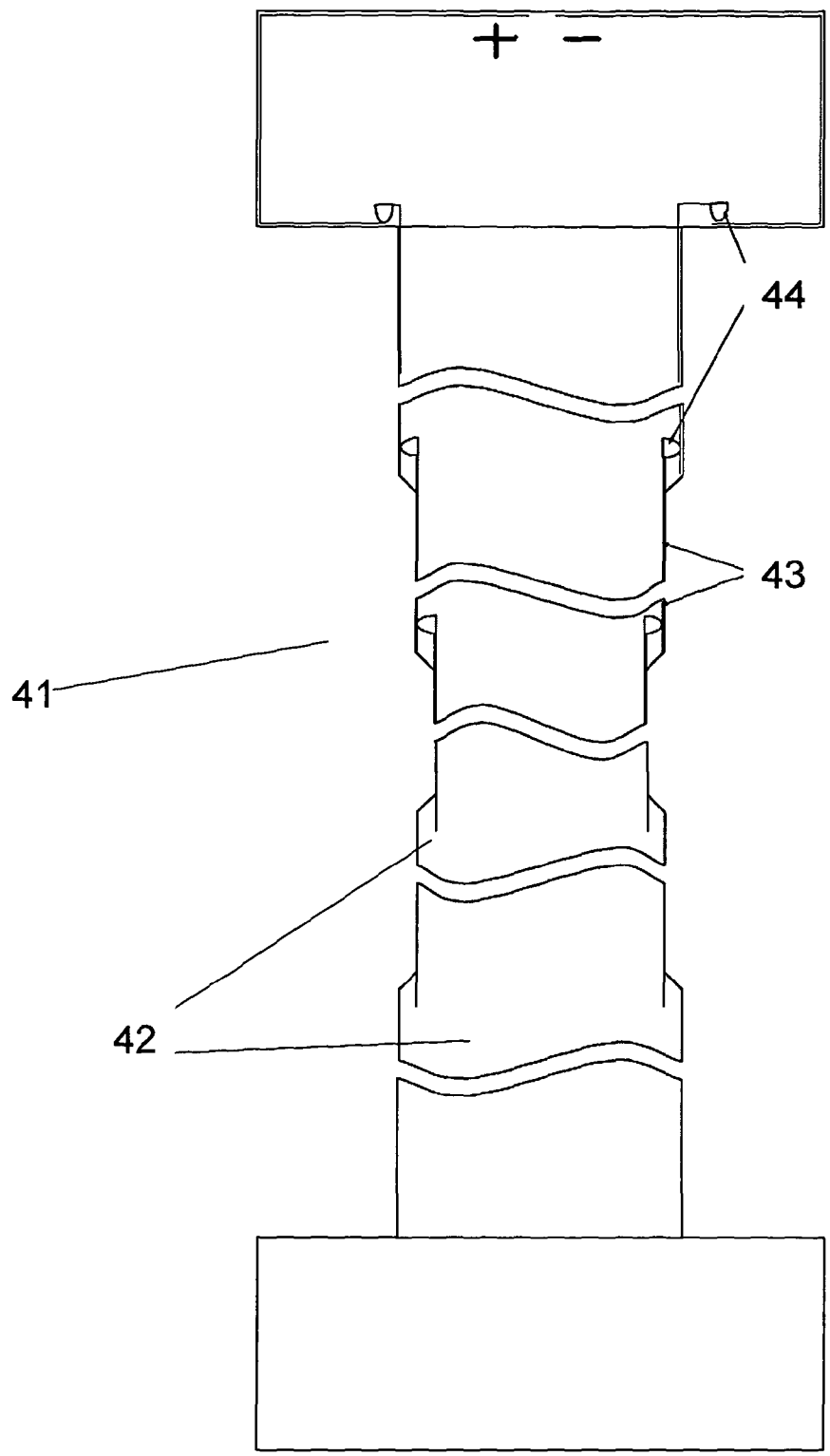
FIG. 5: shows an arrangement for providing electrical signals along the length of the support.

A mechanism for providing power and control signals to the upper rotating member is now described for use when this member contains an actuator and/or sensors. FIG. 5 shows an embodiment using a collapsible mast having wiring provided through the interior of the mast. A telescopic boom style mast

41 is provided having a plurality of telescopic segments 42. Fixed electrical contact strips 43 are provided on the segments of the mast, and complimentary sliding contact points 44 are also provided within the segments, and also within the upper rotating member. As the telescopic segments collapse together, the sliding contact points slide over the fixed contact strips to ensure electrical connection is maintained. Furthermore, the contact point within the upper rotating member allows for rotational movement of the member with respect to the mast, having a complimentary fixed contact strip extending around the hub in a circular fashion. When an inner support is used in conjunction with an outer support, as described above, the wiring can be carried from the point at which the outer support engages with the inner support along the length direction through a multi channel slip ring mechanism (not shown) located on the top of a inner support/mast located within the outer mast. This arrangement provides additional overall structural rigidity and strength during high wind periods. As an alternative, or for use when no mast is provided, power and control signals may be passed to the rotating member via one or more of the backbones. Where three blades are provided, one backbone may provide the positive connection, a second backbone of a different blade could provide the negative connection, and a third backbone of a different blade could provide the earth connection to provide protection in the event of a lightning strike.

Figure 6A:
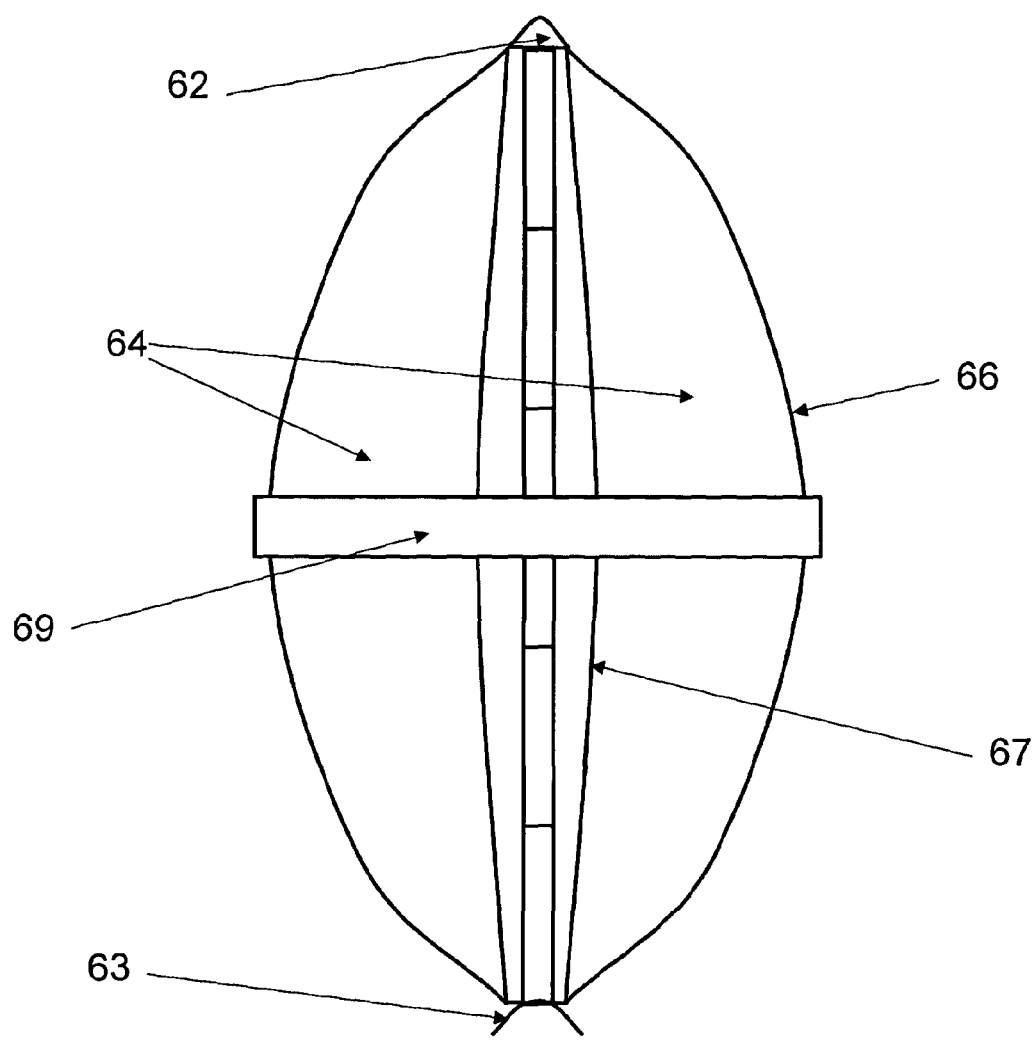
FIG. 6A: shows a turbine arrangement having a restraining ring thereon.
Figure 6B:
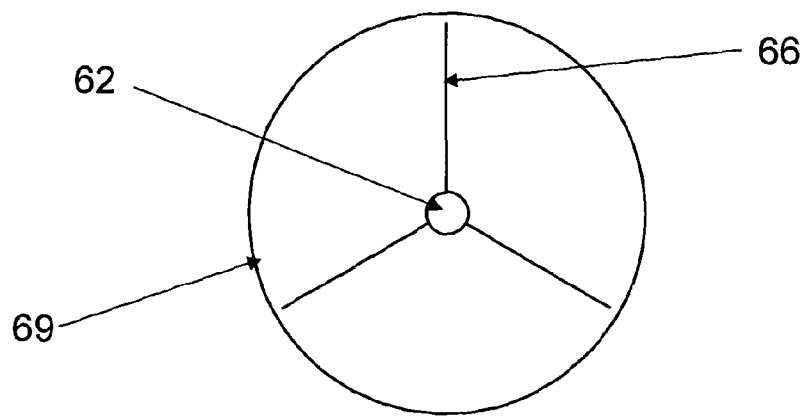
FIG. 6B: shows a top down plan view of FIG. 6A.

In all embodiments one or more restraining rings are preferably provided. An example is shown in FIGS. 6A and 6B. FIG. 6A shows a side view, and FIG. 6B shows a top down plan view, omitting the coupling between the blades and the restraining ring, which is discussed below. The embodiment of the invention shown includes a mast, but it will be understood that this feature is applicable to any embodiment of the invention. FIG. 6A shows a wind turbine according to the invention having a first rotating member 62, a second rotating member for one end of the blade 63 and a number of blades 64 (two are shown), each having outer backbones 66 and inner backbones 67. A restraining ring 69 extends around each of the turbine blades, being attached to each blade at a point along the outer backbone. The ring is formed of a rigid material and is positioned to control the shape of the blades as they distort, particularly to prevent the turbine blades from expanding outwards (i.e. bulging outwards) as the two rotating members are urged closer together and to ensure that the blades all coil in the same direction by the same amount to ensure an equal distribution of weight at all times. The backbones develop a twist between the rotating members, resulting in the backbone, and thus the entire blade, wrapping or coiling around the axis of rotation of the rotating members. Preferably a restraining ring is positioned at the point at which the backbone is radially furthest from the rotation axis (where the backbone bulges out furthest), which corresponds to the mid-point between the rotating members when the blades are fully extended. The restraining ring preferably maintains this mid-point as the position at which the blades extend radially furthest from the axis of rotation of the blades.

Figure 7A:
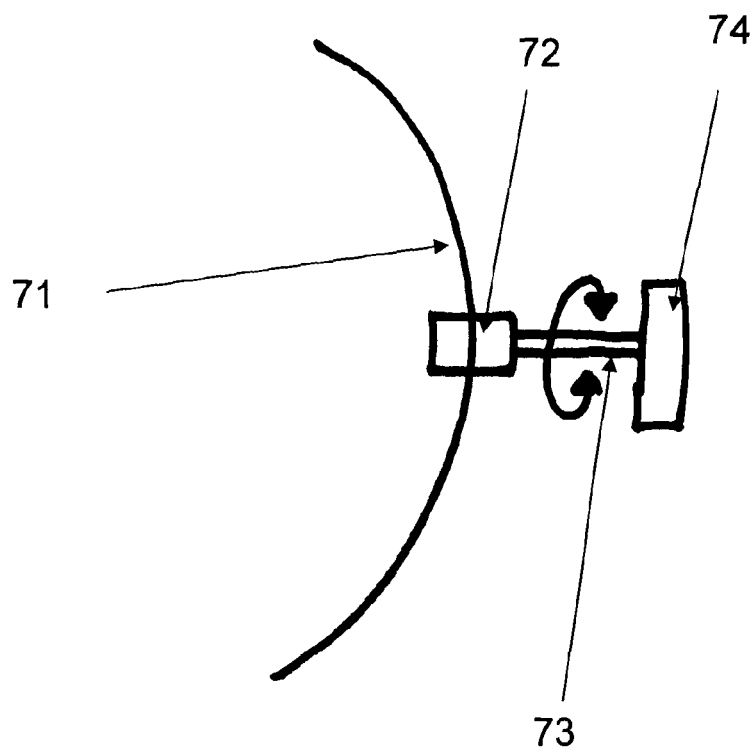
FIG. 7A: shows a coupling between the restraining ring and backbone.

It will be appreciated that as the backbone twists, the orientation of the backbone relative to the restraining ring will change at the point of attachment. If the backbones were rigidly attached to the restraining ring, this would result in a force that counteracts the coiling of the blades about the mast. Therefore, it is preferable to connect the backbone to the restraining ring via a rotating joint, an example of which is shown schematically in FIG. 7A. FIG. 7A shows a cross section showing a portion of a backbone 71 coupled to a restraining ring 74 via a rotatable coupling 73 and a retaining portion 72. The rotatable coupling allows the backbone to change orientation with respect to the restraining ring without exerting a force that would serve to incline the ring from the horizontal. In this way, the restraining ring continues to maintain the mid point of the backbone at a constant distance from the mast. The rotatable coupling may be connected to the restraining ring via a ball and socket joint to allow for a certain degree of flex as the orientation of the blade changes relative to the ring. The retaining portion 72 is not strictly required since the rotatable coupling 73 could be made integral with the backbone.

Figure 6C:
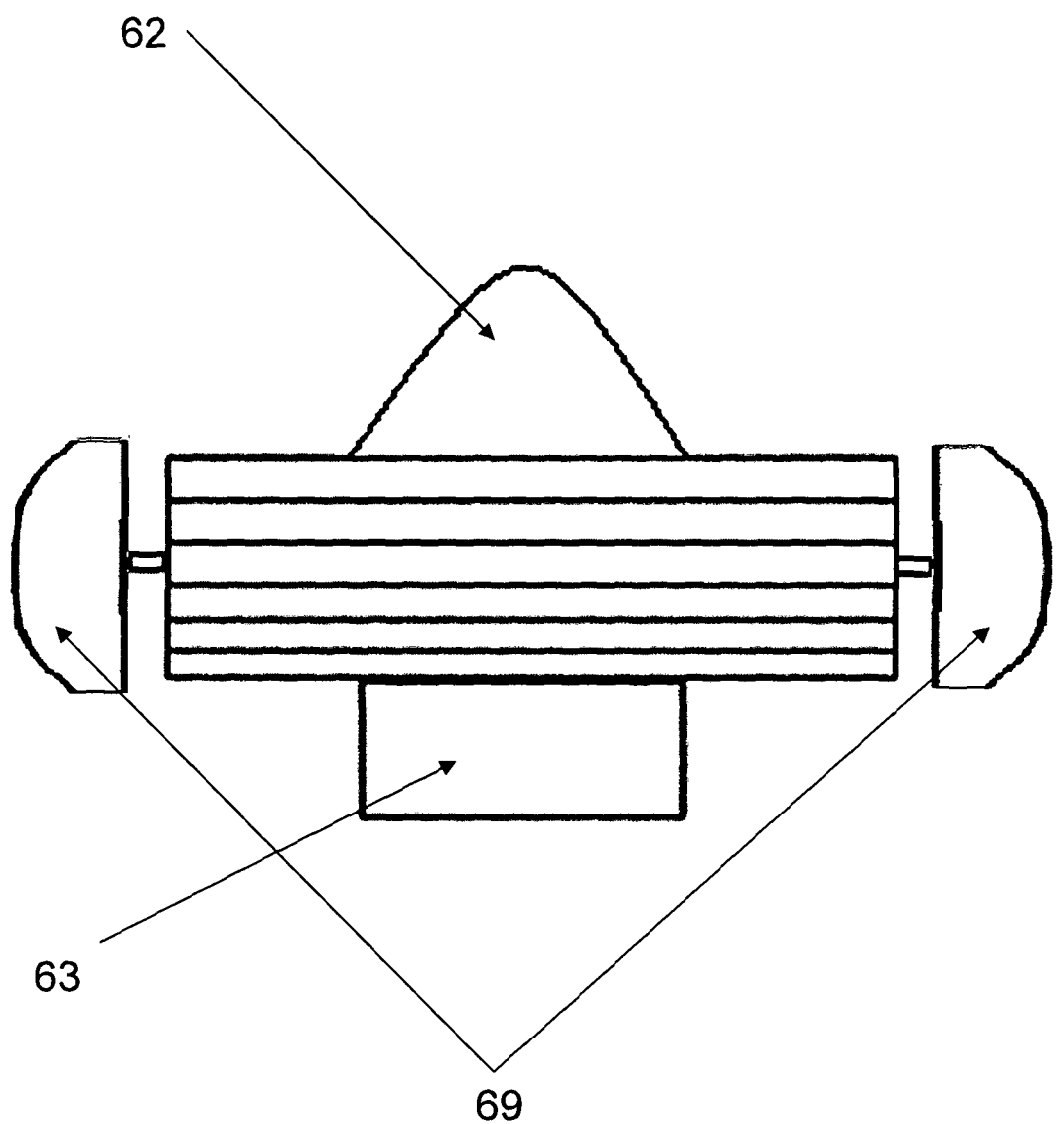
FIG. 6C: shows the arrangement of FIG. 6A when fully collapsed.

FIG. 6C shows, in cross section, how the restraining ring is arranged when the apparatus is fully collapsed. As can be seen, the restraining ring extends along the length of the device, along the direction between the two rotating members 62 and 63. The extension in this direction is the same as the extension of the blades, which are in their most compact position. The restraining ring therefore is arranged to shield or completely cover the blades from oncoming wind when in the collapsed state so that no wind is incident on the blades. This results in a complete stall of the turbine when the blades are completely collapsed. Although the blades are shown as being completely coiled up, in practice there would still be a degree of space between successive "coils", otherwise it would be difficult to un-coil the blades when required.

Figure 7B:
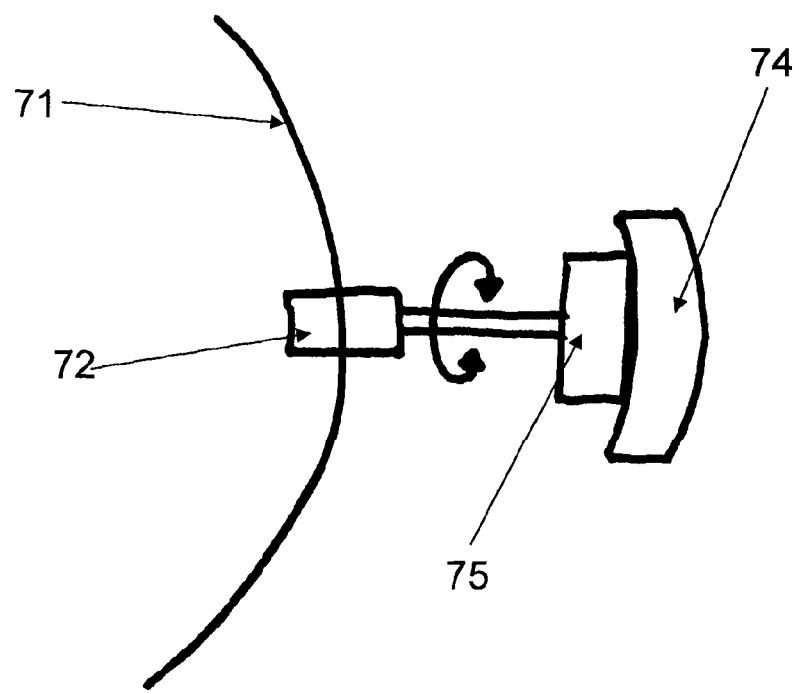
FIG. 7B: shows an alternate coupling to FIG. 7A.

FIG. 7B shows a further feature that can be incorporated into the restraining ring. Reference numbers are shared with FIG. 7A. Rather than connecting the rotatable coupling directly to the restraining ring, an actuator 75 is provided in between. The actuator is used to control the degree of rotation of the coupling, and therefore to assist in twisting the outer backbone when it collapses. An actuator may be present on each coupling between the restraining ring and a backbone. This helps to distribute the pressure or forces applied to the backbone when the profile of the blades is being altered. Rather than applying a force at one point, which is the case where only one of the rotating members contains an actuator, forces can be applied at both ends of the backbone (using an actuator in each rotating member) and at the mid-point by using actuators on the restraining ring.

Figure 7C:
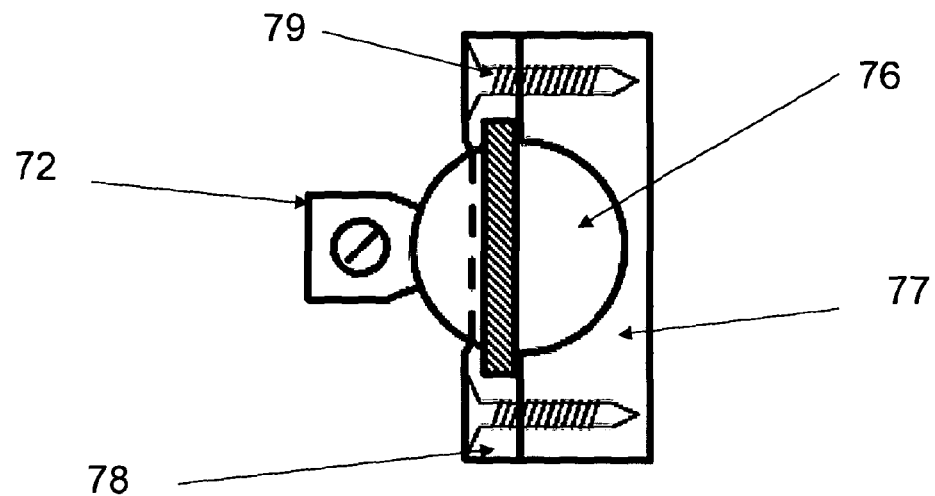
FIG. 7C: shows an alternate coupling to FIGS. 7A and 7B.
Figure 7D:
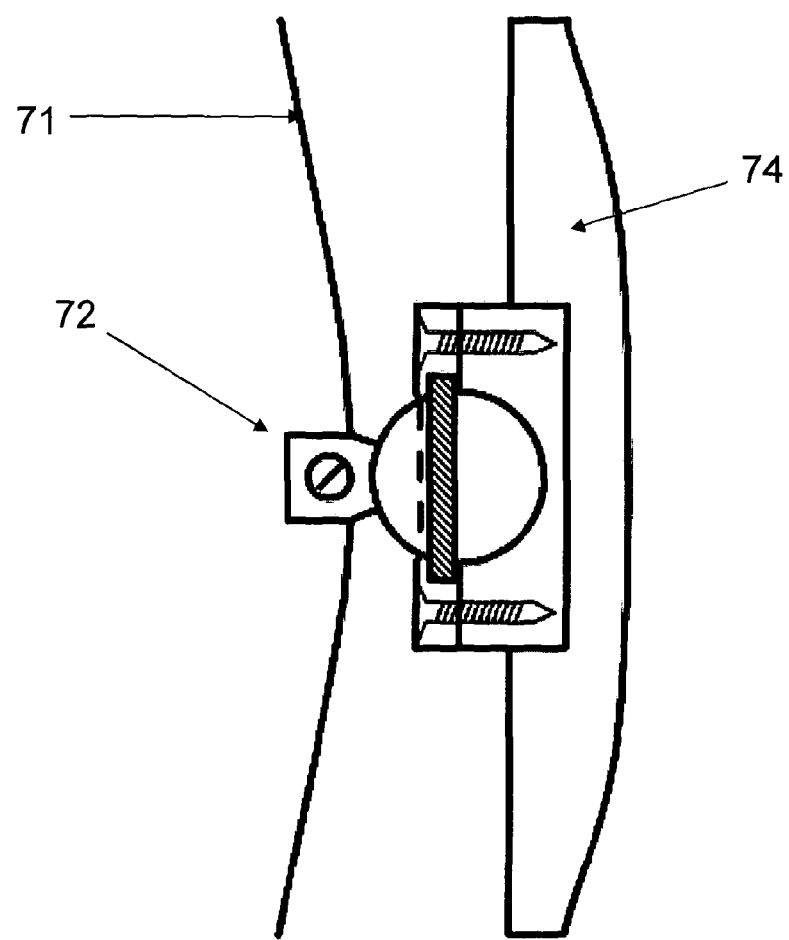
FIG. 7D: shows the coupling when attached to the restraining ring and backbone.

FIGS. 7C and 7D show an alternative arrangement for the coupling between the restraining ring and the outer backbone. As with FIGS. 7A and 7B, a retaining portion 72 is provided for attaching the mounting to the blade. The retaining portion is connected directly to a ball and socket joint arrangement. The ball portion 76 is held within a receptacle formed from first portion 77 and second portion 78. The two portions are held together by fixing means, such as one or more screws 79. The receptacle may be in the form of a substantially spherical recess. The ball is able to rotate and twist about any axis within the socket, allowing the restraining ring to restrict the movement of the blades without hampering their coiling about their axis of rotation. FIG. 7D shows the alternative arrangement connected to a backbone 71 and restraining ring 74. The coupling between the blades and the restraining ring may be in the form of other types of joints. As with the coupling between the blades and the rotating members, a universal joint could be used, preferably also being able to twist about its longitudinal axis to provide freedom of movement as the blades coil or uncoil as the case may be. A multi roller bearing universal joint or any other type of free joint allowing movement in all planes could by used. Of course, it would also be possible to provide actuators as discussed in relation to FIG. 7B.

As well as couplings between the restraining ring and outer backbone it is also possible to have couplings between the inner backbone and the central support, or mast, where such a support is used. The couplings may take the same form as those described for FIGS. 7A-7D and could be distributed along the length of the mast. In particular, where a telescopic mast is used, a coupling could be provided on each collapsible segment of the mast. Each segment of the mast would be capable of rotating relative to the other, said rotation being caused by the twisting of the blade about the mast, said twisting action being transferred to the mast segment by the coupling.

Figure 9:
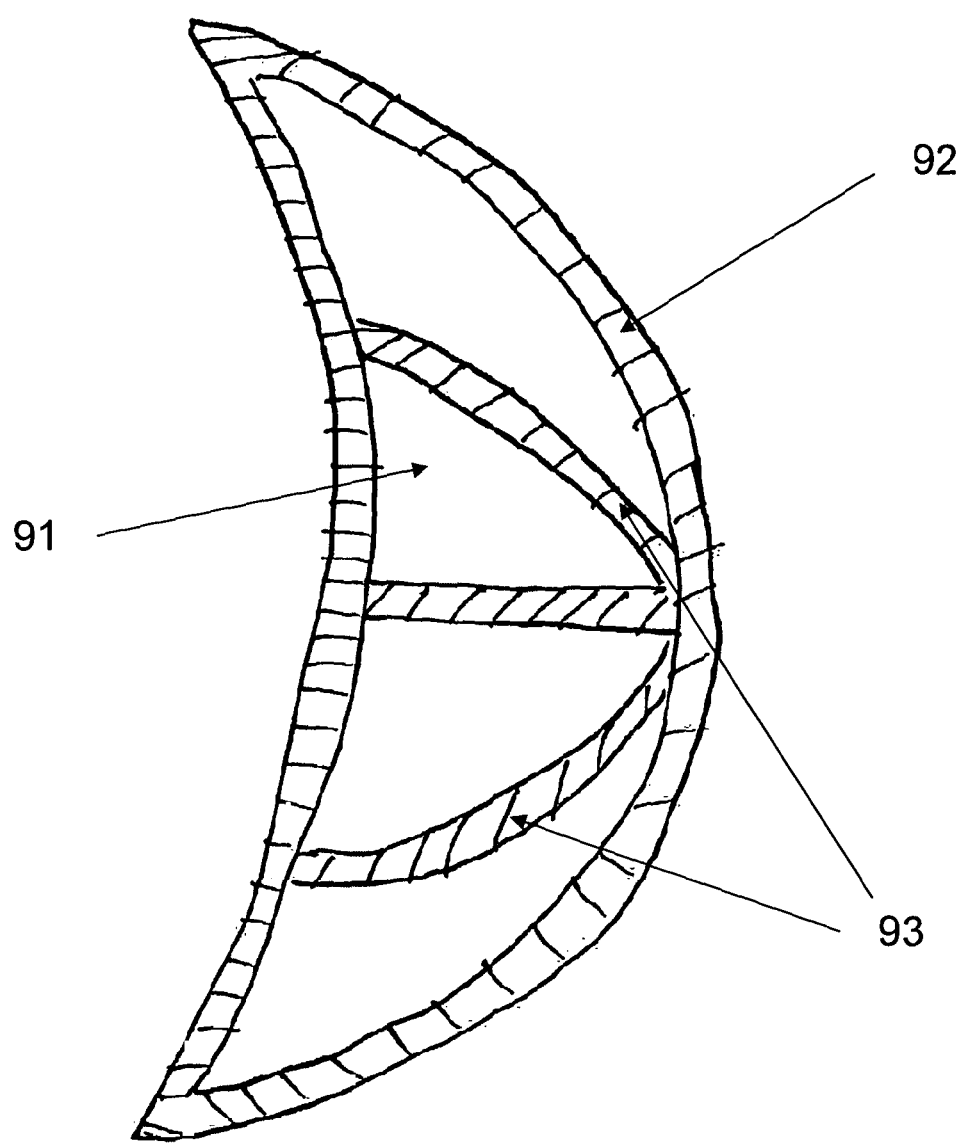
FIG. 9: shows a rotor blade with a reinforcement structure.

The blades may comprise one or more reinforcement sections preferably comprised of a more rigid material than the blade material such that they do not distort, although a certain amount of give to account for high velocity winds would be preferable. A reinforcement section may extend around the perimeter of the blade, or a portion thereof, on one or both sides. Reinforcement sections may additionally or alternatively extend across the blade structure, for example in a ribbing like structure. FIG. 9 shows a single blade comprising a first blade material 91 and a reinforcement section 92 extending around the blade. As can be seen from the figure, the reinforcement section also includes rib sections 93 that extend across the blade. The one or more reinforcement ribs would be positioned at various points on each blade and would preferably extend across the blade substantially perpendicular to the axis of rotation. Preferably, a reinforcement rib could be provided at each point at which there is a coupling between the mast and the inner backbone, but they could also be used in any other embodiment of the invention. These rib sections could also extend in the manner shown in the figure, extending across the width of the blade but also extending, to a certain extent, in the longitudinal direction of the blade. This can be achieved by the reinforcement sections curving across the blade, as in the figure, or being angled appropriately. The reinforcement sections or ribs may be part of the blade substructure, or alternatively, or in addition, may be formed on the outer side of the blade, formed over the blade material. The reinforcement sections provide a level of rigidity in order to capture air without the blades being overly distorted. This reinforcement also assists in maintaining the shape of the blade throughout operational adjustments of blade profile.

The blades may be made in a modular fashion, with each modular section of the blade being defined by one or more reinforcement sections. The reinforcement sections may couple to another section of blade, either to another reinforcement section or to a section of blade material, to form a complete blade. The blade sections could be coupled together by a common reinforcement section. The reinforcement sections may be comparatively rigid relative to the blade material and can be arranged in such a manor as to fold onto the other thereby creating an overall flexible blade profile to operate in a similar manner as a completely flexible blade within the turbine system. Each modular section of the blade may be made of a flexible blade material combined with more rigid reinforcement sections. Alternatively, the entire modular section may be rigid, but each modular section is connected to the other modular sections by joints arranged to allow relative movement between the sections so as to form an overall flexible blade. The joint mechanisms may allow movement in specific predefined planes to ensure that the blades are able to coil about an axis in the desired manner, such as the manner described in relation to FIG. 2. The modular section may be formed of a rigid or substantially rigid material such as carbon fibre.

It is possible to provide a window or slot on the apparatus to reduce the cross-section presented to oncoming wind. Such a window can be formed in the mast itself or alternatively in each of the blades, in the fabric portion. The window may occupy up to one third of the surface area of the fabric. The window may run along the length of the mast or may extend along only a portion of the length of the mast.

In order to connect the turbine blades to electricity generating means in the case where only one of the rotating members contain an actuator, the mast or shaft, or the other rotating member, may be connected to the alternator, or to an intervening gearing mechanism. Alternatively, when both rotating members contain actuators, the second rotating member is preferably connected directly to an alternator, although again it is also possible to use an intervening gearing mechanism if required.

Although the above embodiments relate to a vertically mounted turbine, it is also possible to mount the turbine in other orientations, such as horizontally.

Figure 8:
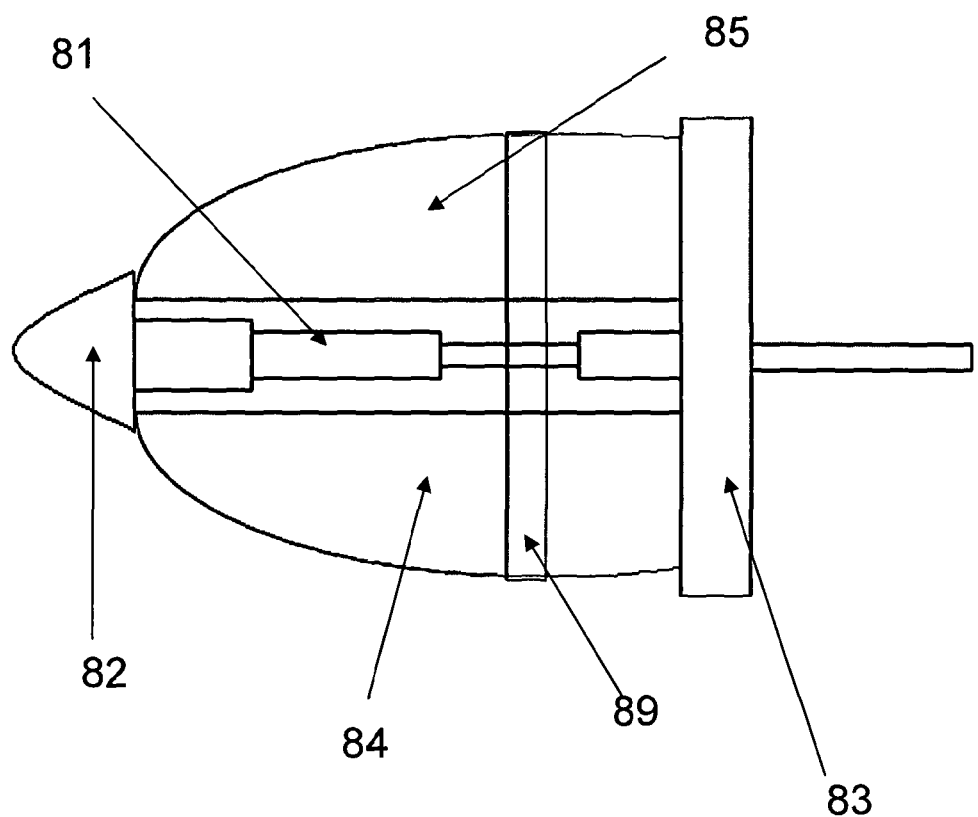
FIG. 8: shows a horizontally mounted embodiment of the invention.

An example of a horizontal arrangement is shown in FIG. 8, which shares many of the same features as with the vertical arrangements described previously. A mast or support 81 extends substantially horizontally and a first rotating member 82 is mounted rotatably on, and preferably at one end of, the mast. The first rotating member preferably has a pointed, rounded conical shape for aerodynamic purposes such that air incident horizontally is channelled into the blades. Such a rounded conical shape could also be used with vertically mounted embodiments. A second rotating member 83 is also provided and is secured to the mast. The first rotating member 82 is positioned at one end of the mast and the second rotating member 83 is positioned at the other end. The mast 81 is mounted so that it can rotate about its long axis (in FIG. 8A the horizontal axis); the second rotating member 83 is fixed to the mast and rotates with it; and the first rotating member 82 is connected to the mast such that it can selectively rotate with the mast, or rotate relative to the mast. One or more blades 84/85 are connected to the two rotating members 82 and 83 in the manner described for vertical arrangements. A restraining collar 89 may also be provided as discussed previously.

As can be seen from FIG. 8, the blades have a greater width at the point at which they contact the second rotating member 83 than they do at the point of contact with the first rotating member 82 (a feature which can also be applied to vertically mounted embodiments discussed above). Consequently, the restraining ring, 89, need not be placed at the mid-point between the rotating members but rather at any other point that it is desired to restrain the width of the blades to a desired dimension. In particular, the distance between the first rotating member 82 and the restraining ring 89 is greater than the distance between the restraining ring and the second rotating member 83 so that air flowing over the blades in the direction from the first rotating member to the second rotating member is able to escape rather than impacting on the member 83 causing a buffeting force. The blades themselves need not be curved in the elliptical way shown in the Figure, and they could be shaped in a triangular fashion extending from the first to the second rotating member.

In embodiments of the invention where the blades have a greater width at the point at which they contact the second rotating member it is possible for the inner backbone to be coupled to the second rotating member in such a way that the second rotating member can rotate with, or relative to the inner backbone. Since the outer backbone is mounted on the second rotating member, actuating means could be used to rotate the second member relative to the inner backbones to cause the outer backbone to coil around the axis of rotation. Therefore, the flexible blades may be more triangular in shape, with one end mounted on a rotating member and another end mounted on a second rotating member.

All the features discussed for vertical arrangements could also be implemented with horizontal arrangements.

With all embodiments of the invention, the turbine can be connected to an alternator to generate electricity either by connecting the rotating mast to the alternator, or connecting the mounting to the alternator.

A device, according to the current invention, can find utility anywhere that it can be mounted, which includes street lamps, or electricity pylons where it may provide electricity directly to the grid. The device may be scaled to any size. Particular target sizes include an uncoiled blade length of between 30 and 40 feet, and particularly 36 feet, for a 2-3MW commercial generator and an uncoiled blade length of 4-10 feet, and preferably 7 feet, for a 12-25 kW generator. Of course, larger structures or smaller structures could be constructed.

Vertical and horizontal embodiments of the invention are particularly suitable for mounting on a gas filled balloon, and supported in the air. The apparatus is preferably mounted on the balloon by the restraining ring.

The above embodiments described relate to turbine arrangements suitable for connection to an alternator to form an electricity generator. Wind applications are generally discussed, but a rotor according to the invention could be used to generate electricity from any moving fluid such as water. Embodiments of the invention could also be powered to rotate and generate thrust, being used, for example, to propel vessels through various mediums, such as aerial or nautical applications, where a high efficiency variable thrust system is required. The invention can therefore be considered to relate to rotor systems and not just to turbines for generation of electricity.

The invention claimed is:

1. A rotor system comprising:
   a support;
   first and second rotating members coupled to the support, the first and second rotating members being able to rotate about a common axis;
   one or more flexible blades having two ends, a first end of each flexible blade being mounted on the first rotating member and a second end of each flexible blade being mounted on the second rotating member so that the first and second ends are rotatable about the common axis; and
   actuating means arranged to cause the first and second ends of each flexible blade to move closer together by movement of at least one of the first and second rotating members along the common axis;
   wherein the first and second rotating members are able to rotate relative to each other, said relative rotation allowing each of the one or more flexible blades to coil around a further axis.

2. The rotor system according to claim 1 wherein the actuating means is arranged to cause movement of at least one of the first and second rotating members along the common axis by causing the first and second rotating members to rotate relative to each other, said relative rotation causing the one or more flexible blades to coil around their further axis and the first and second ends of each flexible blade to move closer together by movement of at least one of the first and second rotating members along the common axis.

3. The rotor system according to claim 1 wherein each of the one or more flexible blades comprises a first flexible backbone, mounted at one end on the first rotating member and at other end on the second rotating member, and wherein a flexible blade material is attached along one side of the first flexible backbone.

4. The rotor system according to claim 3 wherein each of the one or more flexible blades further comprises a second flexible backbone coupled at one end to the first rotating member and at other end to the second rotating member, and wherein the flexible blade material is also attached to the second flexible backbone along a side different from the one side of the first flexible backbone.

5. The rotor system according to claim 4 wherein the support comprises the second flexible backbones of the one or more flexible blades, the first and second rotating members being able to rotate with the second flexible backbones.

6. The rotor system according to claim 5 wherein the actuating means is arranged to allow the first rotating member to selectively rotate with the second flexible backbones or relative to the second flexible backbones.

7. The rotor system according to claim 4 wherein each of the second flexible backbones is coupled to the first rotating member such that the actuating means is capable of selectively rotating the first rotating member relative to the second backbone causing each of the one or more flexible blades to coil around their further axis.

8. The rotor system according to claim 1 wherein the support comprises a rotatable mast, the first and second rotating members being able to rotate with the rotatable mast.

9. The rotor system according to claim 8 wherein the rotatable mast is collapsible.

10. The rotor system according to claim 9 wherein the rotatable mast is telescopic.

11. The rotor system according to claim 8 wherein the actuating means is arranged to allow the first rotating member to selectively rotate with the rotatable mast or relative to the rotatable mast.

12. The rotor system according to claim 4 wherein the actuating means is arranged to twist the first flexible backbones of the one or more flexible blades, said twisting resulting in a rotational force that causes the first rotating member to rotate relative to the second rotating member.

13. The rotor system according to claim 1 wherein the support comprises a non-rotatable mast.

14. The rotor system according to claim 1 wherein each of the one or more flexible blades has a slot, extending along the common axis of rotation of the first and second rotating members and between the first and second ends of each flexible blade, each slot extending up to ⅓ of a width of each the flexible blade.

15. The rotor system according to claim 1 further comprising a restraining ring attached to each of the one or more flexible blades and arranged to restrict expansion of each of the one or more flexible blades perpendicular to their further axis.

16. The rotor system according to claim 15 wherein the restraining ring is located at substantially a midpoint between the first and second rotatable members.

17. The rotor system according to claim 15 wherein the restraining ring is attached to each of the one or more flexible blades by a rotatable coupling to allow the one or more flexible blades to change orientation with respect to the restraining ring without changing orientation of the restraining ring.

18. The rotor system according to claim 15 wherein the restraining ring is attached to each of the one or more flexible blades by a ball and socket joint.

19. The rotor system according to claim 15 wherein actuating means is provided between the restraining ring and the one or more flexible blades and is arranged to control orientation of the one or more flexible blades.

20. The rotor system according to claim 1 wherein the one or more flexible blades are comprised of a plurality of substantially rigid modular sections coupled together by joints arranged to allow relative movement between said modular sections enabling the one or more flexible blades to coil around their further axis.

21. A wind turbine or a generator comprising a rotor system according to claim 1.

22. The rotor system according to claim 1 wherein each of the one or more flexible blades comprises a fabric material, the fabric material being a carbon fiber material or nylon.

23. The rotor system according to claim 1 wherein the further axis is the common axis.

* * * * *